United States Patent [19]

Kawada

[11] Patent Number: 4,672,483
[45] Date of Patent: Jun. 9, 1987

[54] INFORMATION RECORDING AND READING APPARATUS HAVING RECORDING ERROR CHECKING CIRCUIT

[75] Inventor: Michitaka Kawada, Tokyo, Japan

[73] Assignee: NEC Corporation, Japan

[21] Appl. No.: 751,651

[22] Filed: Jul. 3, 1985

[30] Foreign Application Priority Data

Jul. 4, 1984 [JP] Japan .................. 59-138525

[51] Int. Cl.⁴ ............................................ G11B 5/09
[52] U.S. Cl. .................................. 360/51; 360/43
[58] Field of Search .................... 360/43, 45, 51

[56] References Cited

U.S. PATENT DOCUMENTS 3,827,078  7/1974  Bauer ................................ 360/45
4,167,760  9/1979  Decker ............................. 360/43

Primary Examiner—Vincent P. Canney
Attorney, Agent, or Firm—Sughrue, Mion, Zinn, Macpeak and Seas

[57] ABSTRACT

An information recording and reading apparatus for a recording medium, such as a magnetic disc or optical disc, which operates under the control of a central controller. The information recorded in the medium is stored in a memory and checked for errors during a time period subsequent to the recording operation by reading the recorded data in a read-after-write process. A comparator compares the content of the memory and the read-after-write signal to determine whether an error has occurred. If an error is detected, the data is re-recorded in a different part of the recording medium.

10 Claims, 5 Drawing Figures

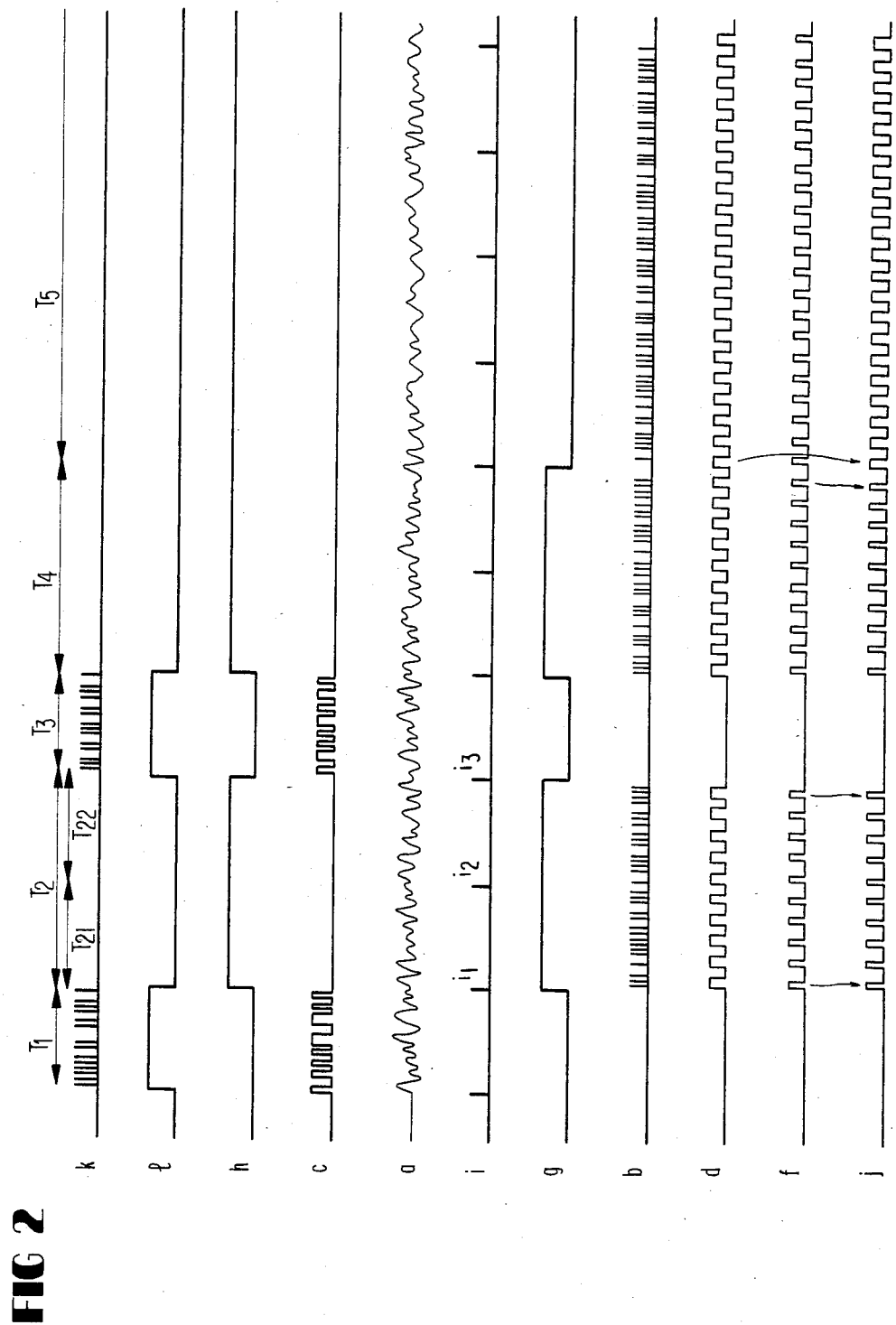

INFORMATION RECORDING AND READING APPARATUS HAVING RECORDING ERROR CHECKING CIRCUIT

BACKGROUND OF THE INVENTION

The present invention relates to an information recording and reading apparatus for a recording medium such as a magnetic disk and an optical disk, and more particularly, to an error checking circuit in which recorded information on the recording medium is checked to confirm whether the recording has been made correctly.

An information recording and reading apparatus of this kind records digital information on a magnetic disk or an optical disk at a high density to store the vast quantity of the information. The digital information to be stored is translated to such a signal in accordance with the recording code such as frequency modulation (FM) code and modified frequency modulation (MFM) code that includes data bits representing the information to be recorded and clock bits added to the data bit to always change the level of the signal within a predetermined period.

In a reading operation, the recorded signal is read out from the recording medium and transported to a data separator. The data separator has a variable frequency oscillator (VFO) for creating a cyclic square wave signal which is generally called "window signal" to separate the data bits from the read-out signal. Such a data separator is disclosed in the U.S. Pat. No. 3,792,361, issued on Feb. 12, 1974, and entitled "HIGH SPEED DATA SEPARATOR". This data separator is designed for the read-out signal of the MFM code, in which the data pulses and the clock pulses are created in accordance with the read-out signal. The data pulses are utilized for sampling the data bits of the read-out signal, and correspond to the above-mentioned "window signal". The frequency of the window signal is so determined as to synchronize with that of the read-out signal, and pulse width of the window signal is uniquely determined by the characteristic of the VFO.

In the recording and reading apparatus, mis-recording is caused due to a defect and/or dust which may exist on the recording medium. If the mis-recording is detected, the information should be recorded again on another area of the recording medium. For this purpose, the recording and reading apparatus is provided with a checking function to detect whether or not the recording operation has been made correctly in order to guarantee that information is properly recorded on the medium. That is, the apparatus should read the recorded signal from the medium after the recording operation is completed and compare it with the information to be recorded. In general, this checking is called a "read-after-write" operation. Heretofore, in both the read-after-write operation and the normal reading operation, the same window signal is utilized to sample the data bits from the read-out signal.

An additional problem is that the quality of the signal recorded on the medium is gradually deteriorated by the reading operation, the dust adhering to the medium, distortion of the medium itself, change of the surrounding temperature, and so on. Accordingly, the error rate of the reading operation may gradually be increased even if the recorded signal on the medium had been checked as correct by the read-after-write operation.

SUMMARY OF THE INVENTION

Therefore, an object of the present invention is to provide an information recording and reading apparatus which can accurately check the signal recorded on a recording medium with high reliability.

Another object of the present invention is to provide an information recording and reading apparatus in which the error rate of a reading operation is reduced.

A recording and reading apparatus for reading a recorded signal from a recording medium according to the present invention comprises reading means for reading the recorded signal from the recording medium, the reading means producing from the read-out signal a digital data signal having clock bits and data bits; first generating means for generating a first window signal having a cyclic waveform so as to take first and second states in synchronization with the digital data signal such that said first and second states correspond to the data bits and clock bits of the digital data signal, respectively, the first state continuing in a first period; and second generating means for generating a second window signal having a cyclic waveform so as to take third and fourth states in synchronization with the first window signal such that the third and fourth states corresponds to the first and second states, respectively, the third state continuing in a third period shorter than the first period; the data bits of the digital data signal being sampled by using the first window signal in the read operation and by using the second window signal in the read-after-write operation.

BRIEF DESCRIPTION OF THE DRAWINGS

The above-mentioned and other objects, features and advantages of the present invention will be better understood from the following detailed description of a preferred embodiment of the present invention taken in conjunction with the accompanying drawings, wherein;

FIG. 2 is a waveform chart for explaining the operations of the apparatus shown in FIG. 1;

DESCRIPTION OF THE PREFERRED EMBODIMENT

Figure 1:
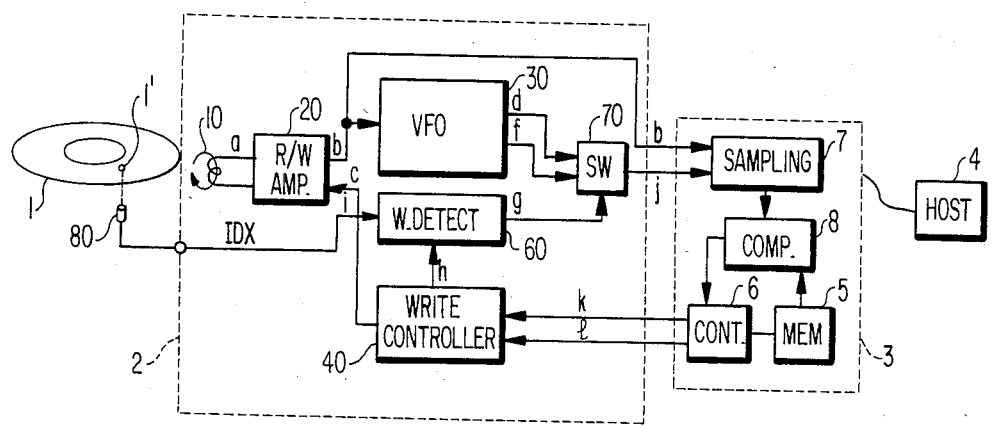
FIG. 1 is a block diagram of a recording and reading apparatus according to an embodiment of the present invention.

Referring to FIG. 1, a recording and reading apparatus of a flexible disk driving apparatus according to an embodiment of the present invention comprises a flexible disk 1, a flexible disk drive 2 for recording information onto and reading information from the flexible disk 1, and disk drive control unit 3 for controlling the disk drive 2 in accordance with a host computer 4.

In the disk drive 2, a magnetic head 10 is connected to a read/write (R/W) amplifier 20 which amplifier the analog signal a read out from the flexible disk 1 by the magnetic head 10 and translates it to digital signal b. The digital signal b is supplied to a variable frequency oscillator (VFO) 30 and the control unit 3. The VFO 30 creates first window signal d and second window signal f in accordance with the digital signal b. A switching circuit 70 selects the first or second window signal d or f in response to a read-after-write instruction signal g and supplies the selected window signal j to the control unit 3. As described later, the first window signal d is supplied to the control unit 3 during the reading operation, and the second window signal f is supplied to the control unit 3 during the read-after-write operation.

A write controller 40 of the disk drive 2 receives a digital signal k to be recorded on to the disk 1 and recording instruction l from the control unit 3. The digital signal k encoded by the frequency modulation (FM) is translated to a signal c by the controller 40 and supplied to the R/W amplifier 20. The R/W amplifier 20 translates the recording signal c to the analog form and amplifies it suitable to record on the disk 1 via the head 10. If the recording operation is completed, i.e., the recording instruction l turns off, the write controller 40 sends a reading instruction h to a write detecting circuit 60. The write detecting circuit 60 also receives an index signal i which is obtained by an optical sensor 80 detecting an index hole 1' of the disk 1. The index signal i is obtained every one rotation of the disk 1. The wire detecting circuit 60 produces the read-after-write instruction signal g in response to the beginning of the reading instruction h (i.e., the end of the recording instruction 1) until a predetermined number of the pulses of the index signal i are obtained. Thus, the read-after-write instruction signal g is produced immediately after the recording operation during a predetermined number of disk rotations. In this embodiment, the read-after-write instruction signal g is produced during two rotations of the disk 1.

The control unit 3 includes a memory 5 for storing the information to be recorded which is sent by the host computer 4, a recording controller 6 for translating the information to the digital signal k and sending the recording instruction l, a sampling circuit 7 for sampling the data bits of the digital signal b by using the window signal j, and a comparator 8 for comparing the data bit with the information to be recorded which is held in the memory 5. The result of the comparison is supplied to the recording controller 6.

Figure 3:
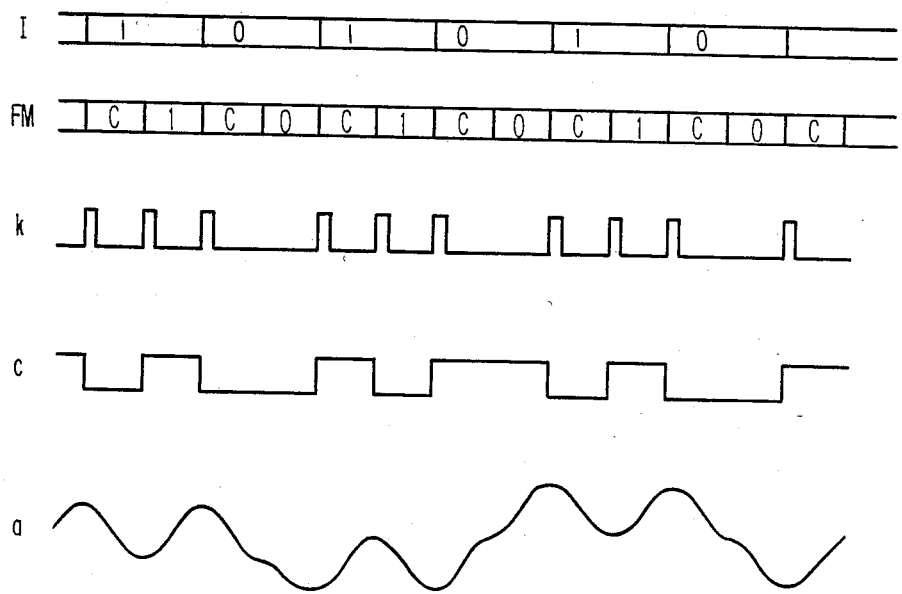
FIG. 3 is a waveform chart for explaining the recording operation of the apparatus shown in FIG. 1.

Referring to FIGS. 2 and 3, the information I to be recorded on the disk are stored in the memory 5. The information I is translated to the FM code form, and then, to the digital signal k (FIG. 3) by the recording controller 6 of the control unit 3. In the recording mode, which occurs during a period $T_1$, the digital signal k is supplied to the write controller 40 together with the recording instruction l. The digital signal k is translated to the signal c of the square waveform, and then, to the analog signal a. The recording medium 1 is magnetized in response to the analog signal a.

When the recording operation is completed by one track, the recording instruction l is turned off and the reading instruction h. Then, the read-after-write instruction signal g is turned on, as described later, to change into the read-after-write mode indicated by a period $T_2$. In this mode, the signal c which had just been recorded is read out. The signal a read-out in the analog form is produced by the magnetic head 10 and translated to the digital signal b. The first and second window signals d and f are produced by the VFO 30, but only the second window signal f is supplied to the control unit 3 as the window signal j in this mode. The AND gate 72 does not have any output during the period of time from $T_1$ to $T_4$. In the period $T_1$ and $T_3$ it has no input d, though it is opened by g. In the periods $T_2$ and $T_4$ it is closed by $\bar{g}$, though its input d is applied.

The output of the AND gate 72 (the first window signal d) is generated only in the period $T_5$ (read mode) when both g and d are present at its inputs.

The data bit of the digital signal b in the period $T_2$ is sampled by the sampling circuit 7 by using the window signal j and compared with the information I still stored in the memory 5 by the comparator 8. The control unit 3 carries out the read-after-write operation to the even sector of the track in the period $T_{21}$ and to the odd sector in the period $T_{22}$. If the data bit of the digital signal b is equal to the information I, the control unit 3 recognizes that the recording operation is correctly completed. If not, the recording controller 6 of the control unit 3 carries out the recording operation for the same information I again on another area of the recording medium 1.

The recording and the read-after-write operation for the next track are carried out in the same manner as indicated by the periods $T_3$ and $T_4$.

When the recording and read-after-write operations for all the information to be recorded may be completed, the disk drive 2 is changed into the reading mode, as indicated by the period $T_5$. In this mode, the recording instruction l and the read-after-write instruction signal g take the off state and only the reading instruction takes the on state. The reading signal a is produced by the magnetic head 10 and translated to the digital signal b by the R/W amplifier 20. Although both the first and second window signals d and f are created by the VFO 30, only the first window signal d is sent to the control unit 3 as the window signal j to read the digital signal b. The sampling circuit 7 samples the data bit of the digital signal b by using the window signal j and sends the data bit to the host computer 4.

Figure 4:
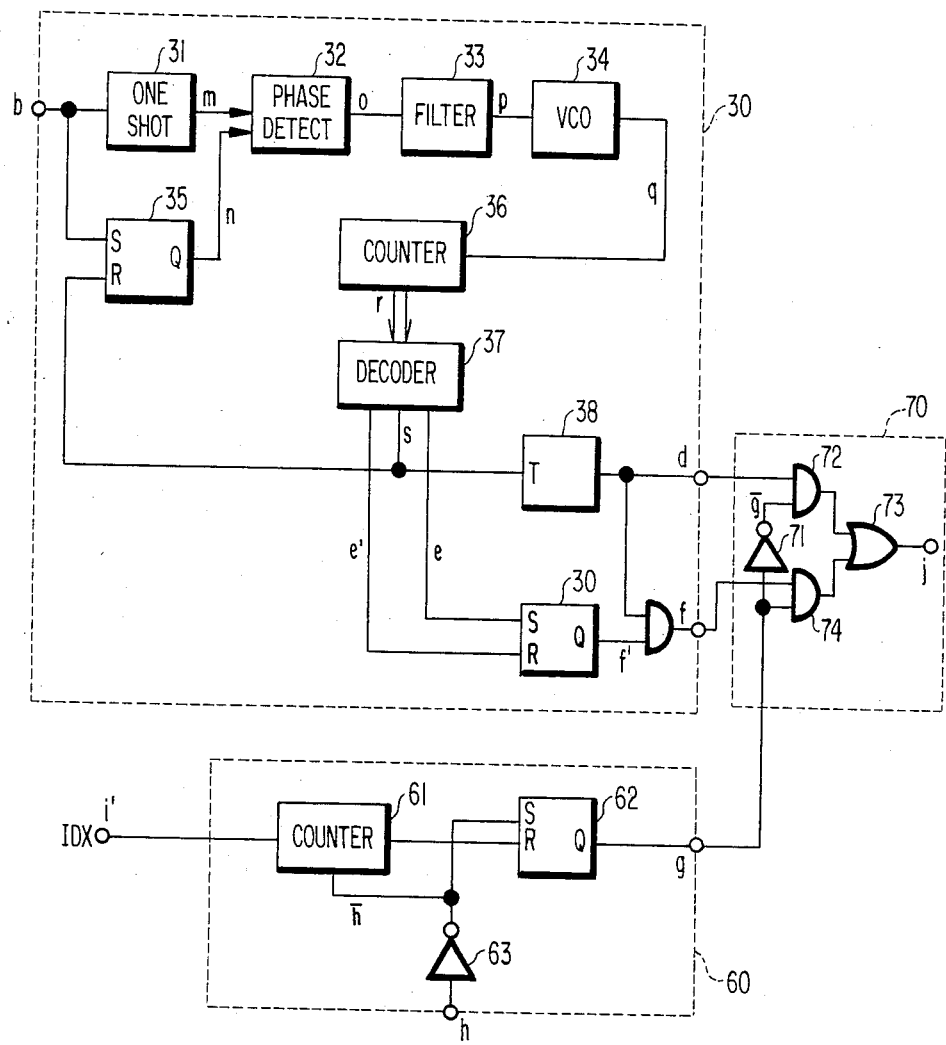
FIG. 4 is a block diagram of the main portion of the apparatus shown in FIG. 1.

A more detailed description of the recording and reading apparatus may be obtained by referring to FIG. 4. There, during the read or read after write mode, the digital signal b is supplied to an one-shot pulse generating circuit 31 and the set terminal of an S-R type flip-flop 35. The outputs m and n of the circuit 31 and the flip-flop 35 are connected to a phase detector 32 in which the phase difference o between the outputs m and n is detected. The phase difference o is translated to a difference voltage p by a filter 33 and supplied to a variable voltage control oscillator (VCO) 34. The VCO 34 produces a pulse signal q whose frequency is varied in response to the difference voltage p, which is supplied to a counter 36. The counter 36 counts the number of pulses in signal q and outputs a count value r from "0" to "7". After the count value r becomes "7", the count value r is returned to "0" by the next pulse signal q input to counter 36.

The count value r of the counter 36 is decoded by a decoder 37 having three output signals s, e and e'. The decoder 37 outputs the signal s when the count value r is "0", the signal e when the count value r is "2" and the signal e' when the count value r is "6". The signal s is connected to the reset terminal of the flip-flop 35 and a T type flip-flop 38. The signals e and e' are connected to the set and reset terminals of a flip-flop 50, respectively. The T type flip-flop 38 changes its output level (high or low) every time the signal s is generated, i.e., every time the count value r returns to "0", so that the rectangular first window signal d is produced. The S-R type flip-flop 50 generates a rectangular signal f which takes high level during the period from he signal e to the signal e', i.e., while the count value r is "2" to "6". The output d of the flip-flop 38 is used as the first window signal. An AND gate 51 is connected to the outputs d and f' of the flip-flops 38 and 50, respectively. The AND gate allows the output f' to pass only when the output d is at a high level. The output f of the AND gate 51 is used as the second window signal.

The first and second window signal d and f are sent to one input terminals of each of AND gates 72 and 74 of the switching circuit 70, respectively. The other input terminal of the AND gate 72 is connected to the line of the read-after-write instruction signal g via an invertor 71 while that of the AND gate 74 is directly connected to the line of the same. Both of the outputs of the AND gates 72 and 74 are connected to an OR gate 73 whose output j is used for the selected window signal.

The write detecting circuit 60 includes a counter 61 and a flip-flop 62. The counter 61 starts its counting operation when a low level signal $\bar{h}$ is supplied thereto, and the flip-flop 62 is set and reset when a low level signal is supplied to its set terminal S and reset terminal R, respectively. The set terminal S of the flip-flop 62 is supplied with the $\bar{h}$ signal which is generated by the inverter 63 from the read instruction signal h. When the instruction signal h turns to a high level, the inverted signal $\bar{h}$ becomes low and the flip-flop 62 is set to output the read-after-write instruction signal g.

The counter 62 is supplied with the index signal i. When the inverted instruction signal $\bar{h}$ turns to the low level, the counter 61 is reset to "0" and starts counting the pulse number of the index signal i. One of the index pulses ($i_1$), generated simultaneously with the instruction signal h is not counted by the counter 61. The counter 61 outputs a signal when it counts two pulses, i.e., the index pulses $i_2$ and $i_3$, which signal is supplied as a reset pulse to the reset terminal R of the flip-flop 62. This turns the output g of the flip-flop 62 to the low level.

Accordingly, the read-after-write instruction signal g turns high in response to the generation of the read instruction signal h and keeps the high level for the period from the index pulse $i_1$, to the index pulse $i_3$, i.e., for two rotation period of the disk 1. The read-after-write instruction signal g makes the AND gate 74 open to supply the second window signal f to the OR gate 73 when its goes high, and the AND gate 72 open to supply the first window signal d to the OR gate 73 when it goes low. In other words, after the recording operation, the disk drive carries out the read-after-write operation during the two rotations of the disk 1 in which the second window signal f is used to separate the data bits from the digital signal b. After that, if the recording instruction l is not generated, the disk drive can carry out the reading operation in which the first window signal d is used to separate the data bits from the signal.

Figure 5:
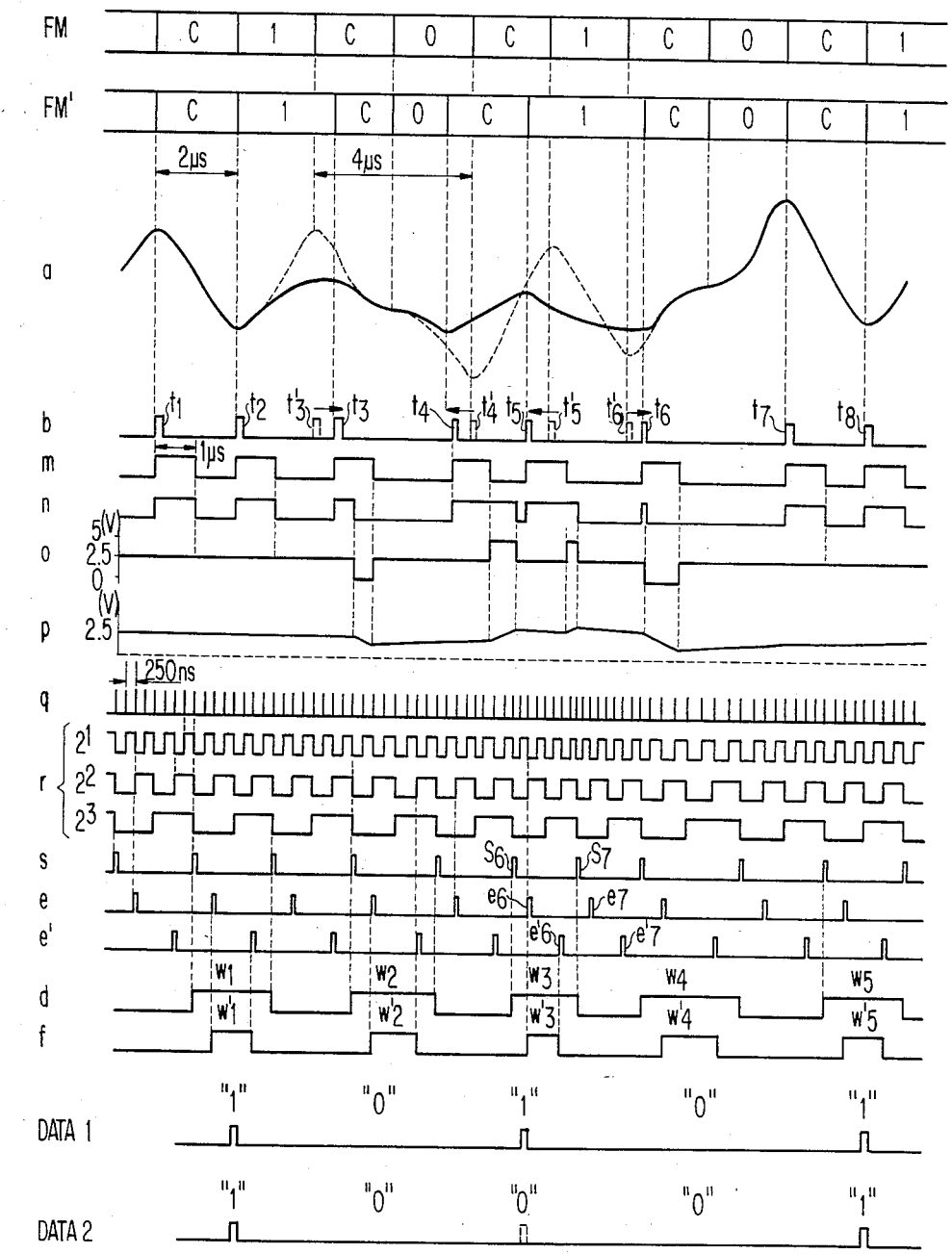
FIG. 5 is a waveform chart for explaining the read-after-write operation of the apparatus shown in FIG. 1.

Referring to FIG. 5, in the read-after-write operation indicated by the periods $T_2$ and $T_4$ in FIG. 2, the recorded data FM' on the recording medium 1 is read by the magnetic head 10 to produce the analog signal a. The analog signal a is translated to the digital signal b by the R/W amplifier 20 which detects the high and low peaks of the signal a. Normally, the minimum period between the peaks is $2\mu$ second and the maximum period is $4\mu$ second. The one-shot circuit 31 is triggered by the pulses $t_n$ and makes a square wave signal m which maintains the high level in the predetermined period ($1\mu$ second). The flip-flop 35 is set by the pulses $t_n$ of the signal b and reset by the signal s from the decoder 37 to produce the square wave signal n.

The phase detector 32 puts out the voltage o of 2.5 V when the high-level period of the signal m is the same as that of the signal n. When the high-level period of the signal m is longer than that of the signal n, the detector 32 puts out the voltage of 0 V during the time that the signal m is higher than the signal n. When the high-level period of the signal n is longer than that of the signal m, the detector 32 puts out the voltage of 5 V during the time that the signal n is higher than the signal m. When the phase detector 32 puts out the voltage 2.5 V, the filter 33 puts out the same voltage 2.5 V, and heightens and lowers the voltage in response to the output voltage o of the phase detector 32. The VCO 34 translates the voltage 2.5 V to the pulse signal q having the pulse interval of 250 nsecond (corresponding to the frequency of 4 MHz), and makes the pulse interval shorter or longer when the voltage p beocmes higher or lower than 2.5 V, respectively. The count value r is increased by the pulse signal q and returns to "0" next to "7". The pulse of the signal s is raised every time the count value r=0 to make the first window signal d. The pulses of the signals e and e' are raised every time the count value r=2 and 6, respectively, to make the second window signal f. Accordingly, the high level period (pulse width) of the second window signal f is shorter than that of the first window signal d. Since the output f' of the flip-flop 50 is gated by the first window signal d, the second window signal f is not turned high level during the low level of the first window signal d.

If the data FM is accurately recorded on the medium 1, the reading signal a shows the waveform as illustrated by a dotted line, and the digital signal b has pulses $t_3'$ to $t_6'$. However, the read-out signal a may be deflected as illustrated by a solid line, due to a defect of the recording medium 1, mis-recording operation, and so on. In this case, the pulses $t_3$ to $t_6$ are shifted in comparison with the pulses $t_3'$ to $t_6'$. For instance, considering the pulse $t_3$ which is shifted to right on the time chart, the pulse $t_3$ delays the rising of the signals m and n. Since the high level period of the signal m is constant (1 $\mu$sec) while that of the signal n is shortened by the signal s, the phase difference is arisen and detected by the phase detector 32. The phase detector 32 makes the voltages o and p lower and the pulse interval of the VCO 34 longer. Therefore, the count operation of the counter 36 and output timing of the signals s, e and e' are also delayed to adjust the rising timing and the width of the high level periods (windows) $w_2$ and $w_2'$ of the first and second window signals d and f.

A large peak shift should not be allowed in the read-after-write operation because mis-reading is supposed to be corrected by this operation. At the portion of a data pulse $t_5$, the reading signal a is largely deflected from the correct form illustrated by the dotted line. As mentioned above, the window $w_3$ of the first window signal d for the data pulse $t_5$ is defined by the pulses $s_6$ and $s_7$ of the signal s while the window $w_3'$ of the second window signal f is defined by the pulses $e_6$ and $e_6'$ of the signals e and e', respectively. If the data pulse $t_5$ is read by using the window $w_3$, the data pulse $t_5$ is read as "1" as shown in DATA 1 and the large peak shift of this portion cannot be detected. On the other hand, in the case where the window $w_3'$ is used in the read-after-write mode, the data pulse $t_5$ cannot be detected within the window $w_3'$ so as to read as "0" as shown in DATA 2. Accordingly, unallowable peak shift is detected by comparing the DATA 2 with the information to be recorded, and the control unit 3 can re-record the information to another area of the recording medium 1.

As described above, according to the present invention, the second window signal is used to sample the data bit of the digital signal read from the recording medium in the read-after-write operation. The second window signal has narrower window than the first window signal which is used in the reading operation. If the recorded data is confirmed to be correctly recorded on the medium by the read-after-write operation, it is guaranteed that the data bits of the recorded data can be accurately read in the reading operation, even if the peak shift occurs in the reading operation, since the first window signal has a wider window than the second window signal. Accordingly, the read-after-write operation is strictly carried out and the recorded information on the recording medium has a high reliability after the read-after-write operation.

What is claimed is:

1. A recording and reading apparatus for recording a data signal on a recording medium, said data signal including at least one data bit representing the information to be recorded and one clock bit corresponding to said data bit in which the recorded data signal is checked after recording to determine whether or not said data signal is correctly recorded on said recording medium in a read-after-write mode and said recorded data is correctly read out from said recording medium in a read mode, comprising:

reading means for reading a recorded data signal from said recording medium, both in said read-after-write and said read mode, said reading means producing from the read out data signal a digital data signal;

first generating means connected to said reading means for generating a first window signal having a cyclic waveform so as to take first and second states in synchronization with said digital data signal such that each of said first and second states corresponds to said data bit and clock bit, respectively, said first state continuing for a first period; and second generating means connected to said reading means for generating a second window signal having a cyclic waveform so as to take third and fourth states in synchronization with said first window signal such that said third and fourth states correspond to said first and second states, respectively, said third state continuing for a second period shorter than said first period;

said data bit of said digital data signal being sampled by using said first window signal in said read mode and by using said second window signal in said read-after-write mode.

2. The recording and reading apparatus as claimed in claim 1, wherein said apparatus is switchable between said read mode and said read-after-write mode and further comprises switching means for selecting one of said first and second window signals, said switching circuit selecting said first window signal when said apparatus is in said read mode and selecting said second window signal when said apparatus is in said read-after-write mode.

3. The recording and reading apparatus as claimed in claim 1, wherein said digital data is established with a particular frequency and said apparatus further comprises a third generating means for generating a pulse signal at a frequency synchronized with the reading of said digital data, and a first counter for counting the number of said pulse signals, whereby said first and second generating means generate said first and second window signals in accordance with the numerical count within said first counter.

4. The recording and reading apparatus as claimed in claim 2, further comprising memory means for storing said digital data, said data bit of said digital data being compared with the content of said memory means.

5. The recording and reading apparatus as claimed in claim 2, further comprising a sensor means for generating an index signal obtained from said recording medium and a second counter for counting the number of said index signal, whereby the period of said read-after-write operation is determined by the count value of said second counter.

6. A recording and reading apparatus for recording a data signal on a recording medium, said data signal including at least one data bit representing the information to be recorded and one clock bit corresponding to said data bit, comprising:

memory means for storing said data signal during a first and second period;

read/write means for recording said data signal onto said recording medium during said first period and for reading said data signal from said recording medium during said second period;

write control means connected between said memory means and said read/write means for providing said data signal stored in said memory means to said read/write means during said first period;

first generating means connected to said read/write means for generating a first window signal having a cyclic waveform so as to take first and second states in synchronization with said digital data signal such that each of said first and second states corresponds to said data bit and clock bit, respectively, said first state continuing for a first period determined by said digital data;

second generating means connected to said read/write means for generating a second window signal having a cyclic waveform so as to take third and fourth states in synchronization with said first window signal such that said third and fourth states correspond to said first and second states, respectively, said third state continuing for a second period shorter than said first period; and switching means for selecting one of said first and second window signals, said switching circuit selecting said first window signal when said apparatus is in the reading operation mode and selecting said second window signal when said apparatus is in the read-after-write operation mode, whereby said data signal recorded on said recording medium during said first period may be read from said recording medium during said second period and compared to said data as stored in said memory means.

7. The recording and reading apparatus as claimed in claim 6 further comprising a comparator means for comparing, during said second period, said stored digital data and said digital data read during said second period.

8. The recording and reading apparatus as claimed in claim 7 further comprising a controller means adapted to receive the results of said comparison whereby either said data signal stored in said recording means is again written on another area of said recording medium or a next data signal is written onto said recording medium.

9. The recording and reading apparatus as claimed in claim 6 wherein said first window has a duration longer than that of said second window.

10. The recording and reading apparatus as claimed in claim 6 wherein said write control means is adapted to implement a read-after-write operation a predetermined period of time after said write operation is completed.

* * * * *